United States Patent
Kindl et al.

(10) Patent No.: US 10,273,866 B2
(45) Date of Patent: Apr. 30, 2019

(54) SUPERCHARGED INTERNAL COMBUSTION ENGINE WITH TURBINE WHICH CAN BE LIQUID-COOLED, AND METHOD FOR CONTROLLING THE COOLING OF SAID TURBINE

(71) Applicant: Ford Global Technologies, LLC, Dearborn, MI (US)

(72) Inventors: Helmut Matthias Kindl, Aachen (DE); Vanco Smiljanovski, Bedburg (DE); Andreas Kuske, Geulle (NL); Franz Arnd Sommerhoff, Aachen (DE); Michael Forsting, Moenchengladbach (DE); Joerg Kemmerling, Monschau (DE)

(73) Assignee: Ford Global Technologies, LLC, Dearborn, MI (US)

( * ) Notice: Subject to any disclaimer, the term of this patent is extended or adjusted under 35 U.S.C. 154(b) by 821 days.

(21) Appl. No.: 14/831,670

(22) Filed: Aug. 20, 2015

(65) Prior Publication Data

US 2016/0076432 A1    Mar. 17, 2016

(30) Foreign Application Priority Data

Sep. 16, 2014   (DE) .................. 10 2014 218 587

(51) Int. Cl.
| | |
|---|---|
| *F01P 3/20* | (2006.01) |
| *F01P 7/14* | (2006.01) |
| *F01D 25/14* | (2006.01) |
| *F01N 3/04* | (2006.01) |
| *F02B 39/00* | (2006.01) |
| *F02C 7/16* | (2006.01) |

(52) U.S. Cl.
CPC ............. *F01P 3/20* (2013.01); *F01D 25/14* (2013.01); *F01N 3/043* (2013.01); *F02B 39/005* (2013.01); *F01N 2260/024* (2013.01); *F01P 2007/146* (2013.01); *F01P 2060/12* (2013.01); *F02C 7/16* (2013.01); *F05D 2220/40* (2013.01); *Y02T 10/20* (2013.01)

(58) Field of Classification Search
CPC ............. F02B 39/005; F01P 2007/146; F01P 2060/12; F01D 25/14; F01D 25/145; F01N 2260/024; F01N 3/043; Y02T 10/144; Y02T 10/20; F05D 2220/40
USPC ............................................ 60/605.3
See application file for complete search history.

(56) References Cited

U.S. PATENT DOCUMENTS

| | | | |
|---|---|---|---|
| 2011/0154818 A1 | 6/2011 | Takahata | |
| 2011/0180026 A1* | 7/2011 | Heusler ............... | F01D 25/14 |
| | | | 123/41.44 |
| 2013/0108414 A1 | 5/2013 | Maeda et al. | |

FOREIGN PATENT DOCUMENTS

| | | |
|---|---|---|
| DE | 3407521 C1 | 3/1985 |
| DE | 10022052 A1 | 3/2001 |
| DE | 19960929 A1 | 6/2001 |

(Continued)

*Primary Examiner* — Jason Shanske
*Assistant Examiner* — Jessica Kebea
(74) *Attorney, Agent, or Firm* — Julia Voutyras; McCoy Russell LLP

(57) ABSTRACT

A method for operating an engine system in an internal combustion engine comprising during a first operating condition, circulating coolant through a coolant jacket in a turbine housing at least partially enclosing a turbine rotor and during a second operating condition, replacing coolant in the coolant jacket with air from a venting reservoir.

20 Claims, 3 Drawing Sheets

(56) References Cited

FOREIGN PATENT DOCUMENTS

| | | | |
|---|---|---|---|
| DE | 102007017973 A1 | 1/2008 | |
| DE | 102006044680 A1 * | 4/2008 | ............ F02B 39/005 |
| DE | 102006053514 A1 * | 5/2008 | ................ F01P 3/20 |
| DE | 102008011257 A1 | 9/2009 | |
| DE | 102008021263 A1 | 11/2009 | |
| DE | 202011001417 U1 | 3/2011 | |
| EP | 1384857 A1 | 1/2004 | |
| JP | 2008019711 A * | 1/2008 | |
| WO | 2009106166 A1 | 9/2009 | |

* cited by examiner

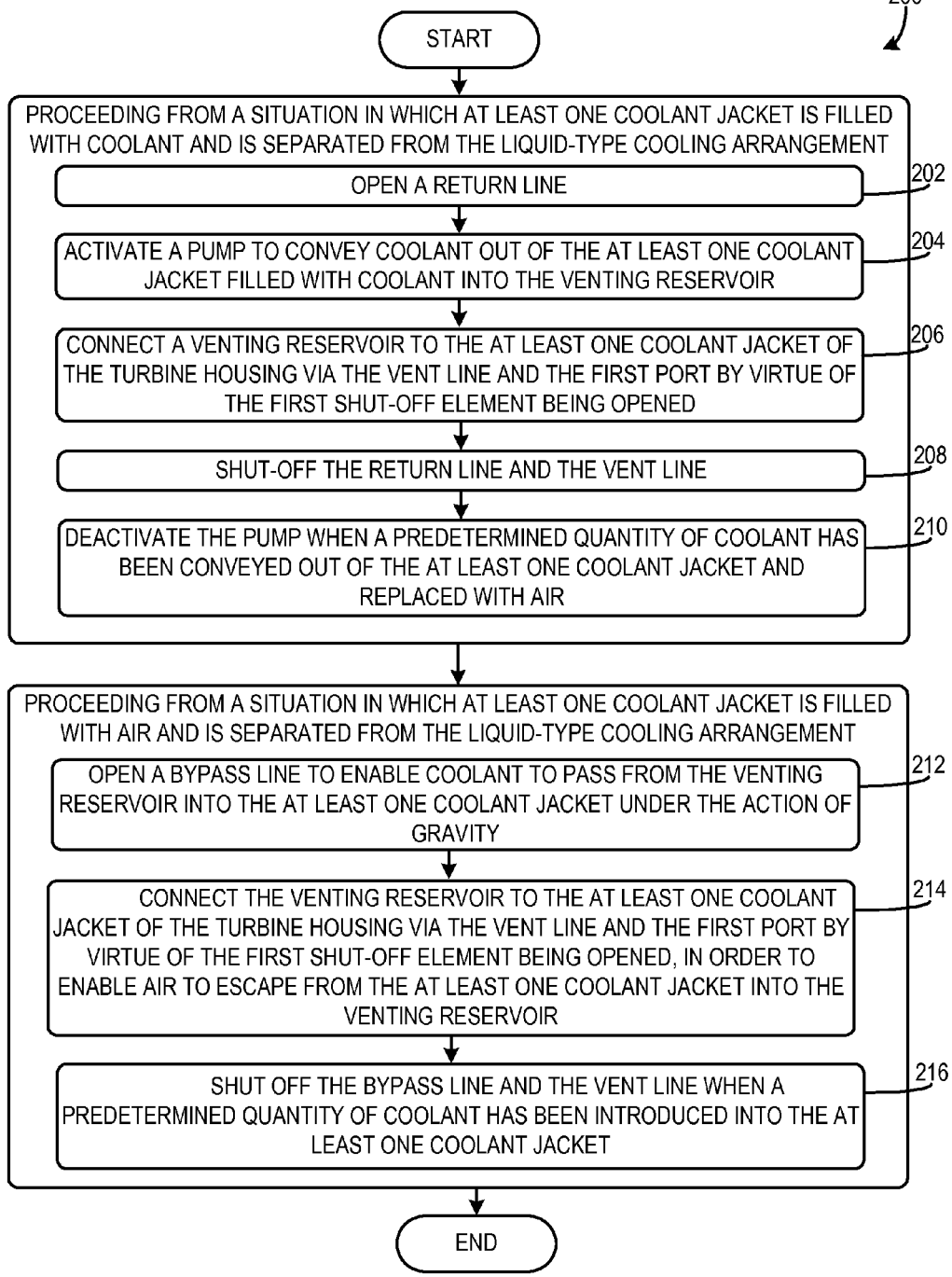

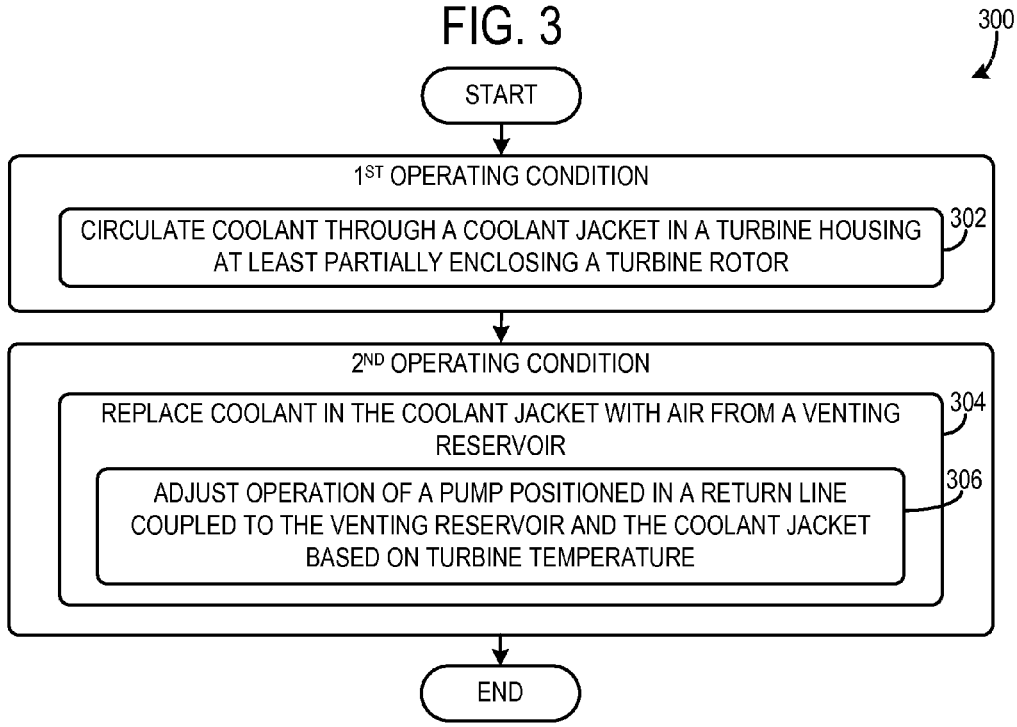

SUPERCHARGED INTERNAL COMBUSTION ENGINE WITH TURBINE WHICH CAN BE LIQUID-COOLED, AND METHOD FOR CONTROLLING THE COOLING OF SAID TURBINE

CROSS REFERENCE TO RELATED APPLICATIONS

The present application claims priority to German Patent Application No. 102014218587.4, filed on Sep. 16, 2014, the entire contents of which are hereby incorporated by reference for all purposes.

FIELD

The invention relates to a cooling arrangement for a turbine in an internal combustion engine.

BACKGROUND

Exhaust driven turbochargers are included in internal combustion engines to increase the power output to weight ratio of the engine. Turbines in the turbochargers may experience high temperature conditions. Consequently, the turbine may be cooled via an engine cooling system branch which is coupled to the engine's radiator. Additionally, the turbine may be constructed out of materials that are less susceptible to the high temperature exhaust system conditions. However, material which can withstand the high temperature conditions may be costly. Furthermore, during other operating conditions the turbine and the engine may have different cooling requirements. Thus, the turbine and/or the engine may be provided with insufficient cooling or warming during certain periods of engine operation.

In one approach, a method for operating an engine system in an internal combustion engine comprising during a first operating condition, circulating coolant through a coolant jacket in a turbine housing at least partially enclosing a turbine rotor and during a second operating condition, replacing coolant in the coolant jacket with air from a venting reservoir. In this way, the turbine may be cooled via a liquid cooling system during certain operating conditions and filled with air during other operating conditions to enable exhaust system components to heat up more quickly as a result. The turbine may be selectively cooled to improve engine operation during a cold start as well as a period of engine operation when the engine has warmed up.

BRIEF DESCRIPTION OF THE FIGURES

FIG. 2 shows a method for controlling the cooling of the at least one turbine configured to be liquid-cooled and included in a supercharged internal combustion engine; and FIG. 3 shows a method for operating an engine system in an internal combustion engine.

DETAILED SPECIFICATION

Figure 1:
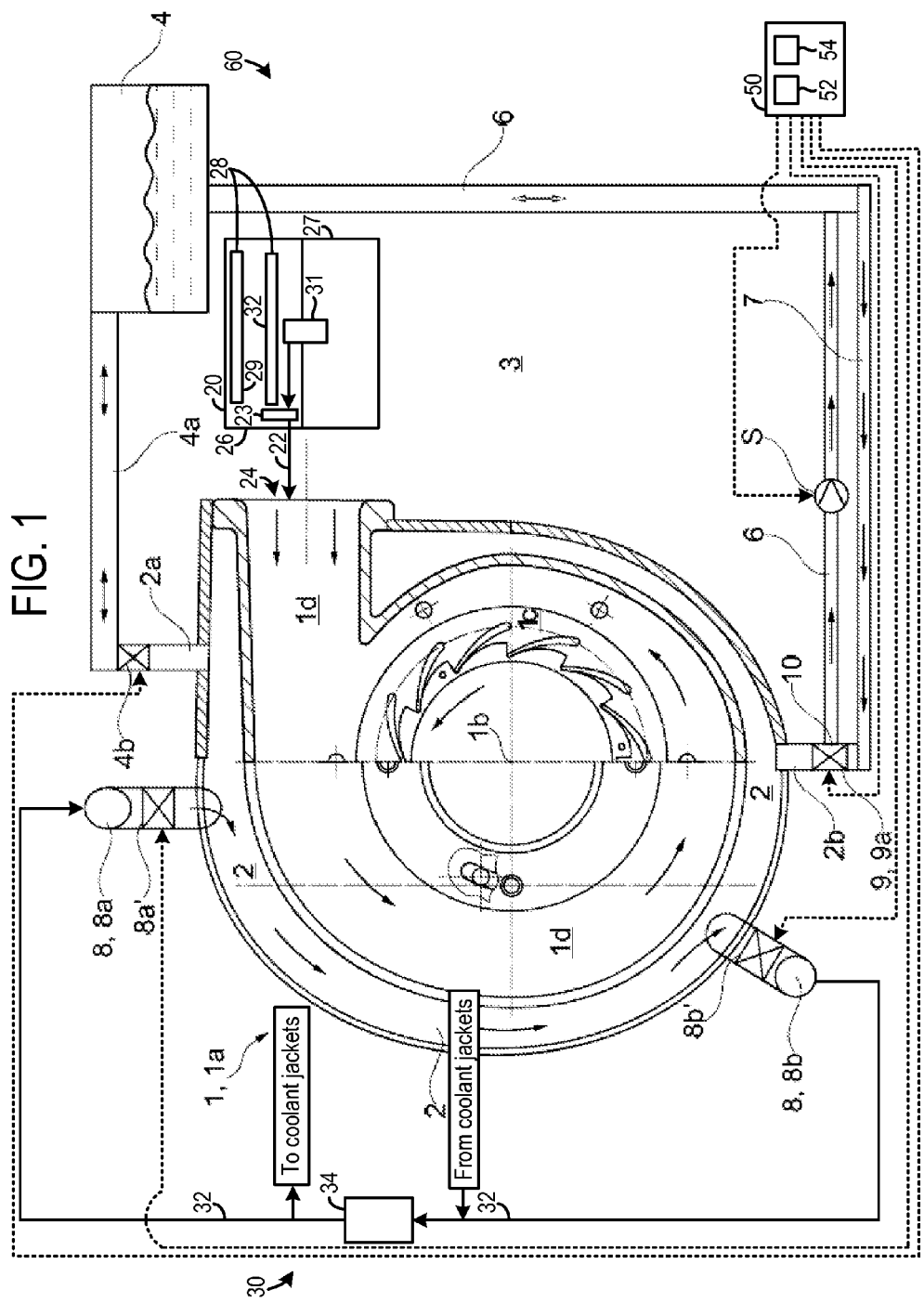
FIG. 1 shows the turbine, which can be liquid-cooled, of a first embodiment of the internal combustion engine, together with secondary circuit, and partially in a section perpendicular to the turbine shaft.

An internal combustion engine used as a motor vehicle drive unit is described herein. As described, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

A supercharged internal combustion engine having a liquid cooling arrangement is described herein. The engine may have at least one cylinder head with at least two cylinders and having at least one turbine, which can be liquid-cooled, of an exhaust-gas turbocharger, in which each cylinder has at least one outlet opening for discharging the exhaust gases out of the cylinder and each outlet opening is adjoined by an exhaust line, the exhaust lines merging to form at least one overall exhaust line such that at least one exhaust manifold is formed, which overall exhaust line opens into the at least one turbine, which has a turbine housing and which has a flow duct which conducts exhaust gas through the turbine housing, and, the at least one turbine has at least one coolant jacket, which is integrated in the housing, in order to form a cooling arrangement. A method for controlling the cooling of the at least one turbine, which can be liquid cooled, of an internal combustion engine of the above type, is also described herein.

The internal combustion engine may have a cylinder block and at least one cylinder head, which are connected to one another at their assembly end sides so as to form the at least two cylinders, that is to say combustion chambers.

To hold the pistons or the cylinder liners, the cylinder block may have a corresponding number of cylinder bores. The pistons may be guided in the cylinder liners in an axially movable fashion and form, together with the cylinder liners and the cylinder head, the combustion chambers of the internal combustion engine.

The cylinder head may also serve to hold the valve drive. To control the charge exchange, control elements and actuating devices for actuating the control elements may be included in the internal combustion engine. During the charge exchange, the combustion gases are discharged via the outlet openings and the combustion chamber is charged, that is to say the fresh mixture or the fresh air is inducted, via the inlet openings. To control the charge exchange, in four-stroke engines, use may be made of lifting valves as control elements, which lifting valves perform an oscillating lifting movement during the operation of the internal combustion engine and which lifting valves open and close the inlet and outlet openings in this way. The valve actuating mechanism required for the movement of the valves, including the valves themselves, is referred to as the valve drive.

In some engines, the inlet ducts which lead to the inlet openings, and the outlet ducts, that is to say the exhaust lines which adjoin the outlet openings, may be at least partially integrated in the cylinder head. The merging of exhaust lines to form an overall exhaust line is referred to generally as an exhaust manifold.

In some engines, downstream of the at least one exhaust manifold, the exhaust gases may be then supplied to at least one turbine of an exhaust-gas turbocharger and possibly conducted through one or more exhaust-gas aftertreatment systems.

The production costs for the turbine may be comparatively high because the—nickel-containing—material often used for the thermally highly loaded turbine housing is expensive, in particular in relation to the material preferably used for the cylinder head, for example aluminum. It is not only the costs for the nickel-containing materials per se but also the costs for machining these materials which are comparatively high.

From that which has been stated above, it follows that, with regard to costs, it would be highly beneficial if a turbine could be produced from a less expensive material, for example aluminum or cast iron.

Using aluminum would also be beneficial in respect of the weight of the turbine, especially when it is taken into consideration that a close-coupled arrangement of the turbine leads to a relatively large-dimensioned, voluminous housing, since the connection of the turbine and cylinder head through a flange and screws requires a large turbine inlet region on account of the restricted spatial conditions, also because adequate space must be provided for the assembly tools. The voluminous housing is associated with a correspondingly high weight. The weight advantage of aluminum over a material capable of bearing high stresses is particularly pronounced in the case of a turbine arranged close to the engine on account of the comparatively high material usage.

To be able to use cheaper materials for producing the turbine, the turbine may be provided with a cooling arrangement, for example with a liquid-type cooling arrangement, which significantly reduces the thermal loading of the turbine and of the turbine housing by the hot exhaust gases and therefore permits the use of thermally less highly loadable materials. As coolant, use is generally made of a water-glycol mixture provided with additives. In relation to other coolants, water has the advantage that it is non-toxic, readily available and cheap, and furthermore has a very high heat capacity, for which reason water is suitable for the extraction and dissipation of very large amounts of heat, which is basically considered to be advantageous.

The turbine housing may be provided with a coolant jacket in order to form the cooling arrangement. In previous turbine designs, both concepts in which the housing is a cast part and the coolant jacket is formed, during the casting process, as an integral constituent part of a monolithic housing, and concepts in which the housing is of modular construction, wherein during assembly a cavity is formed which serves as a coolant jacket.

A turbine designed according to the latter concept is described for example in the German laid-open specification DE 10 2008 011 257 A1. A liquid-type cooling arrangement of the turbine is formed by virtue of the actual turbine housing being provided with a casing, such that a cavity into which coolant can be introduced is formed between the housing and the at least one casing element arranged spaced apart therefrom. The housing which is expanded to include the casing arrangement then encompasses the coolant jacket.

Additionally, EP 1 384 857 A2 likewise discloses a turbine whose housing is equipped with a coolant jacket. DE 10 2007 017 973 A1 describes a construction kit for forming a vapor-cooled turbine casing.

On account of the high specific heat capacity of a liquid, in particular of water which is commonly used, large amounts of heat can be extracted from the housing by a liquid-type cooling system. The heat is dissipated to the coolant in the interior of the housing and is discharged with the coolant. The heat which is dissipated to the coolant is extracted from the coolant again in a heat exchanger.

It is possible for the liquid-type cooling arrangement of the turbine to be equipped with a separate heat exchanger or in the case of a liquid-cooled internal combustion engine— for the heat exchanger of the engine cooling arrangement, that is to say the heat exchanger of a different liquid-type cooling arrangement, to be used. The latter requires corresponding connections between the two circuits. Motor vehicle drives are often equipped with high-powered fan motors in order to provide, at the heat exchangers, the air mass flow needed for a desired level of heat transfer.

In some cases, it may not be the aim of a liquid-type cooling arrangement to extract the greatest possible amount of heat from the internal combustion engine and/or the turbine housing under all operating conditions. Rather, control of the liquid-type cooling arrangement in a manner appropriate to desired engine component operating temperatures.

To reduce the friction losses and thus the fuel consumption of an internal combustion engine, fast warming of the engine oil, in particular after a cold start (e.g., where the engine has cooled to ambient temperature of the ambient environment and is started from the cooled condition), may be desired. Fast warming of the engine oil during the warm-up phase of the internal combustion engine ensures a correspondingly fast decrease in the viscosity of the oil and thus a reduction in friction and friction losses, in particular in the bearings which are supplied with oil, for example the bearings of the crankshaft.

Fast warming of the engine oil in order to reduce friction losses may also be abetted by fast heating of the internal combustion engine itself, which in turn is assisted by virtue of a decrease in heat extraction from the internal combustion engine during the warm-up phase.

In this respect, the warm-up phase of the internal combustion engine after a cold start is an example of an operating mode in which it is advantageous for a decreased amount of heat (e.g., a minimal amount of heat) to be extracted from the internal combustion engine.

The situation is similar for the liquid cooling of a liquid-cooled turbine and specifically cooling the turbine housing, for instance. In the context of controlling the turbine cooling arrangement in a desired manner during the warm-up phase, especially after cold starting of the internal combustion engine, the aim would be decreased (e.g., minimum) heat removal, to ensure that the hot exhaust gas, which then passed uncooled through the turbine, heated up the downstream exhaust gas aftertreatment systems quickly. In the case of a heated-up internal combustion engine or an exhaust-gas aftertreatment system warmed up to operating temperature, in contrast, more or less extensive cooling of the turbine housing would be preferred to protect the housing from thermal overloading by the hot exhaust gas flow.

The conflict of desired engine operating conditions described above has not been resolved in previous engines. Against the background of that stated above, it is an objective of the present description to provide a supercharged internal combustion engine that provides greater control of the cooling arrangement of the turbine. It is a further sub-objective of the present description to specify a method for controlling the cooling arrangement of the at least one turbine which can be liquid-cooled.

The first sub-objective can be achieved by a supercharged internal combustion engine having a liquid cooling arrangement, having at least one cylinder head with at least two cylinders and having at least one turbine, which can be liquid-cooled, of an exhaust-gas turbocharger, in which each cylinder has at least one outlet opening for discharging the exhaust gases out of the cylinder and each outlet opening is adjoined by an exhaust line, the exhaust lines merging to form at least one overall exhaust line such that at least one exhaust manifold is formed, which overall exhaust line opens into the at least one turbine, which has a turbine housing and which has a flow duct which conducts exhaust gas through the turbine housing, and, the at least one turbine has at least one coolant jacket, which is integrated in the housing, in order to form a cooling arrangement, and which supercharged internal combustion engine is distinguished by the fact that the at least one coolant jacket is connectable to the liquid-type cooling arrangement, the at least one coolant jacket is arranged in a secondary circuit, which is separate from the liquid-type cooling arrangement and comprises a venting reservoir which can be filled with air and coolant and which is connectable via a vent line, which conducts air and is closable by means of a first shut-off element, to the at least one coolant jacket of the exhaust-gas discharge system via a first port, a pump is provided in a coolant-conducting return line, which can be shut off and which connects the at least one coolant jacket of the turbine housing to the venting reservoir via a second port, and a coolant-conducting bypass line, which can be shut off, for bypassing the pump is provided, which connects the venting reservoir to the at least one coolant jacket of the turbine housing via the second port.

According to the description, the at least one coolant jacket integrated in the turbine housing can be filled with coolant or air, wherein a coolant jacket filled with coolant is advantageously connected to the liquid-type cooling arrangement of the heated-up internal combustion engine in order to actively extract heat from the housing and reduce the likelihood (e.g., prevent) thermal overloading of the housing by hot exhaust gas.

Proceeding from a situation in which a coolant jacket is filled with coolant and separated from the liquid-type cooling arrangement of the internal combustion engine, the coolant can be transferred by a pump, via the return line, into a provided venting reservoir and can be replaced with air from the venting reservoir via the vent line. Finally, if the return line and the vent line are shut off and the pump deactivated, the at least one coolant jacket previously filled with coolant is charged with air.

Proceeding from a situation in which a coolant jacket is filled with air and separated from the engine cooling system, opening a bypass line allows coolant to pass into the at least one coolant jacket from the venting reservoir under the action of gravity, wherein the air in the coolant jacket escapes into the venting reservoir via the open vent line. Finally, if the bypass line and the vent line are shut off again, the at least one coolant jacket previously filled with air is charged with coolant.

In order to be able to exchange the medium in the at least one coolant jacket, a secondary circuit may be constructed that is separated or can be separated from the engine cooling system and which, in addition to the at least one coolant jacket and the venting reservoir which is filled or can be filled with air and coolant, comprises an air-conducting vent line, a coolant-conducting return line and a coolant-conducting bypass line, which bypasses the pump arranged in the return line.

The vent line, the return line and the bypass line are each connected to the venting reservoir and, via the first or second port, to the at least one coolant jacket of the turbine housing and can be opened or shut off.

In one example, by discharging the coolant from and introducing air into the at least one coolant jacket of the turbine housing, the cooling capacity is reduced (i.e., lowered), decreasing the amount of heat that is removed from the housing. This is advantageous in the warm-up phase of the internal combustion engine, especially after a cold start.

The hot exhaust gas passes through the turbine without cooling and heats exhaust-gas aftertreatment systems arranged downstream.

After the exhaust-gas aftertreatment systems have warmed up and the exhaust-gas aftertreatment conversion rate reaches a desired level, the air in the coolant jacket of the turbine housing can be replaced by coolant, and an adequate coolant flow rate through the housing and cooling of the turbine housing can be ensured by connection to the engine cooling system. The latter may also take place even before the end of the warm-up phase of the internal combustion engine, with the result that the coolant warmed in the turbine housing is used for rapid heating of the internal combustion engine, thereby reducing friction losses and hence the fuel consumption of the internal combustion engine.

The conflict of previous aims is resolved, wherein the turbine cooling meets or can meet a very wide variety of cooling requirements. The concept according to the present description has proven to be particularly advantageous, or especially during the warm-up phase and after a cold start. For the production of the turbine described herein, it is possible to use a material which exhibits low resistance to thermal loads and is cheaper, preferably gray cast iron, cast steel or the like, if appropriate with additives such as silicon-molybdenum (SiMo), in one example.

The first sub-objective, described above, can thereby be achieved, that is to say a supercharged internal combustion engine is provided which is improved with regard to the cooling arrangement of the turbine.

In one example, the internal combustion engine is an exhaust gas-turbocharged internal combustion engine, wherein at least one turbine, which can be liquid-cooled, is a constituent part of the exhaust-gas turbocharger. Owing to the relatively high exhaust-gas temperatures, a supercharged internal combustion engine is subjected to particularly intense thermal load, for which reason cooling of the turbine of the at least one exhaust-gas turbocharger is advantageous.

Supercharging serves to increase the power of the internal combustion engine and/or enable a decrease in size of the engine for an equivalent power output of a larger naturally aspirated engine. Here, the air needed for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. For the same vehicle boundary conditions, it is thus possible to shift the load collective toward higher loads, where the specific fuel consumption is lower. Supercharging consequently assists in the constant efforts in the development of internal combustion engines to reduce fuel consumption, that is to say to improve the efficiency of the internal combustion engine.

The advantage of an exhaust-gas turbocharger in relation to a mechanical charger is that no mechanical connection for transmitting power is required between the charger and internal combustion engine. While a mechanical charger draws the energy needed for driving it directly from a rotational output the internal combustion engine, the exhaust-gas turbocharger utilizes the exhaust-gas energy of the hot exhaust gases.

The at least one turbine may be designed as a radial turbine, that is to say the flow approaching the rotor blades runs substantially radially. Here, "substantially radially" means that the speed component in the radial direction is greater than the axial speed component. The speed vector of the flow intersects the shaft or axle of the turbine, specifically at right angles if the approaching flow runs exactly radially. To make it possible for the rotor blades to be approached by flow radially, the inlet region for the supply of the exhaust gas is often designed as an encircling spiral or volute housing, such that the inflow of exhaust gas to the turbine runs substantially radially.

The at least one turbine may however also be designed as an axial turbine in which the speed component in the axial direction is greater than the speed component in the radial direction.

If the cylinder head has two cylinders and only the exhaust lines of one cylinder form an overall exhaust line that issues into the at least one turbine, this is likewise an internal combustion engine that can be used with the turbine cooling system described herein.

If the cylinder head has three or more cylinders, and if only the exhaust lines of two cylinders merge to form an overall exhaust line, this is likewise an internal combustion engine that can be used with the turbine cooling system described herein.

Embodiments in which the at least one cylinder head has, for example, four cylinders in an in-line arrangement and the exhaust lines of the outer cylinders and the exhaust lines of the inner cylinders merge to form in each case one overall exhaust line, are likewise internal combustion engines that can be used with the turbine cooling system described herein.

In the case of three or more cylinders, embodiments are therefore also advantageous in which at least three cylinders are configured in such a way as to form two groups with in each case at least one cylinder, and the exhaust lines of the cylinders of each cylinder group merge to form a respective overall exhaust line, thus forming an exhaust manifold.

Said embodiment is suitable in particular for the use of a two-channel turbine. A twin-channel turbine has an inlet region with two inlet ducts, with the two overall exhaust lines being connected to the twin-channel turbine in such a way that in each case one overall exhaust line opens out into one inlet duct. The merging of the two exhaust-gas flows which are conducted in the overall exhaust lines takes place if appropriate downstream of the turbine. If the exhaust lines are grouped in such a way that the high pressures, in particular the pre-outlet shocks, can be maintained, a two-channel turbine is particularly suitable for pulse supercharging, by means of which high turbine pressure ratios can be obtained even at low rotational speeds.

The grouping of the cylinders or exhaust lines however also offers advantages for the use of a plurality of turbines or exhaust-gas turbochargers, with in each case one overall exhaust line being connected to one turbine.

Embodiments are however also advantageous in which the exhaust lines of all the cylinders of the at least one cylinder head merge to form a single, that is to say common, overall exhaust line.

Further advantageous embodiments of the supercharged internal combustion engine will be discussed in conjunction with the additional potential features.

Embodiments of the supercharged internal combustion engine are advantageous in which the bypass line for bypassing the pump branches off from the return line downstream of the pump and re-enters the return line upstream of the pump, forming a first junction point, wherein a shut-off device is provided which opens either the return line or the bypass line or shuts off the return line and the bypass line.

In the present case, the bypass line and the return line share common line segments, thereby reducing the total length of the line system. This also has advantages as regards weight and the space requirement (i.e., the packaging requirements). The formation of a first junction point allows control both of the return line and of the bypass line by means of just a single shut-off valve element (e.g., a 3/2-way valve).

Embodiments of the supercharged internal combustion engine in which the shut-off device is a 3/2-way valve, which is arranged at the first junction point and which is connected to the second port of the at least one coolant jacket, to the return line and to the bypass line, are therefore also advantageous in this context.

However, embodiments of the supercharged internal combustion engine in which a respective shut-off element is arranged in the bypass line and in the return line may likewise be advantageous.

Embodiments of the supercharged internal combustion engine are advantageous in which the first port of the at least one coolant jacket is situated at a geodetically (e.g., gravitationally) higher point than the second port of the at least one coolant jacket. If coolant flows (i.e., is introduced), into the coolant jacket via the second port, the air can escape via the first port, which is situated at a geodetically higher point, namely into the venting reservoir if the venting reservoir is situated at a geodetically higher point than the first port.

Proceeding from a situation in which a coolant jacket is filled with air, coolant passes into the at least one coolant jacket from the venting reservoir via the bypass line under the action of gravity. Such filling of the coolant jacket with coolant using gravity requires a difference in the geodetic height, specifically both a difference in geodetic height between the venting reservoir and the second port and a difference in geodetic height between the second and the first port.

For the abovementioned reasons, embodiments of the internal combustion engine in which the venting reservoir is situated at a geodetically higher point than the first port of the at least one coolant jacket, and embodiments of the internal combustion engine in which the venting reservoir is situated at a geodetically higher point than the second port of the at least one coolant jacket, are therefore also advantageous.

Where reference is made in the context of the present description to a geodetic height difference or a geodetic height, this is in relation to the installation position of the internal combustion engine together with the components thereof and to a horizontal vehicle.

Embodiments of the supercharged internal combustion engine are advantageous in which the turbine housing is an integrally cast part. Through casting and the use of corresponding cores, it is possible to form the complex structure of the housing in one working step, such that subsequently only finish machining of the housing and assembly are necessary in order to form the turbine. Here, freedom from leakage is provided.

Also advantageous are embodiments of the supercharged internal combustion engine in which the turbine housing of the at least one turbine is constructed in modular fashion from at least two components, wherein each of the at least two components can be a casting (i.e., a component produced in a casting process).

Embodiments of the supercharged internal combustion engine are advantageous in which each cylinder has at least two outlet openings for discharging the exhaust gases out of the cylinder.

It is the objective of the valve drive to open and close the outlet of the combustion chambers at the correct times, with fast opening of the largest possible flow cross sections being sought in order to keep the throttling losses in the outflowing exhaust gases low and in order to ensure effective, that is to say complete, discharge of the exhaust gases. It may be therefore advantageous for the cylinders to be provided with two or more outlet openings.

Embodiments of the supercharged internal combustion engine are advantageous in which the at least one coolant jacket is connectable to the liquid-type cooling arrangement of the internal combustion engine via a supply opening and via a discharge opening. If the at least one coolant jacket is connected to the liquid-type cooling arrangement of the internal combustion engine, the other components and assemblies required to form a cooling circuit need fundamentally be provided only singularly, as these may be used both for the cooling circuit of the turbine and also for that of the internal combustion engine, which leads to synergies and cost savings, but also entails a weight saving. The heat dissipated to the coolant in the internal combustion engine and in the turbine housing can be extracted from the coolant in a common heat exchanger.

In this context, embodiments of the supercharged internal combustion engine are advantageous in which a second shut-off element which opens or shuts off the supply opening is provided on the inlet side and a third shut-off element which opens or shuts off the discharge opening is provided on the outlet side.

Embodiments of the supercharged internal combustion engine are advantageous in which the exhaust lines merge to form at least one overall exhaust line within the at least one cylinder head, thus forming at least one integrated exhaust manifold.

It must be taken into consideration that it is fundamentally sought to arrange the turbine, in particular the turbine of an exhaust-gas turbocharger, as close as possible to the outlet of the cylinders in order thereby to be able to utilize the exhaust-gas enthalpy of the hot exhaust gases, which is determined significantly by the exhaust-gas pressure and the exhaust-gas temperature, and to ensure a fast response behavior of the turbine or of the turbocharger. Furthermore, the path of the hot exhaust gases to the different exhaust-gas aftertreatment systems should also be as short as possible such that the exhaust gases are given little time to cool down and the exhaust-gas aftertreatment systems reach their operating temperature or light-off temperature quickly, in particular after a cold start of the internal combustion engine.

It is therefore sought to reduce (e.g., minimize) the thermal inertia of the part of the exhaust line between the outlet opening at the cylinder and the turbine or between the outlet opening at the cylinder and the exhaust-gas aftertreatment system, which can be achieved by reducing the mass and the length of said part.

To achieve this aim, the exhaust lines may be merged within the cylinder head, such that at least one integrated exhaust manifold is formed.

The length of the exhaust lines is reduced in this way. Firstly, the size of the line volume, that is to say the exhaust-gas volume of the exhaust lines upstream of the turbine, is reduced, such that the response behavior of the turbine is improved. Secondly, the shortened exhaust lines also lead to a reduced thermal inertia of the exhaust system upstream of the turbine, such that the temperature of the exhaust gases at the turbine inlet is increased, as a result of which the enthalpy of the exhaust gases at the inlet of the turbine is also higher.

Merging the exhaust lines within the cylinder head furthermore allows dense packaging of the drive unit, reduces the number of components and facilitates assembly.

However, a cylinder head with an integrated exhaust manifold is thermally more highly loaded than a conventional cylinder head which is equipped with an external manifold, and therefore places greater demands on the cooling arrangement.

Embodiments of the supercharged internal combustion engine are therefore also advantageous in which the at least one cylinder head is provided with at least one coolant jacket, which is integrated in the cylinder head, in order to form a liquid-type cooling arrangement.

Liquid-type cooling necessitates that the cylinder head be equipped with at least one coolant jacket, that is to say necessitates the provision of coolant ducts which conduct the coolant through the cylinder head. The heat is dissipated to the coolant in the interior of the cylinder head. Here, the coolant is fed by a pump arranged in the cooling circuit, such that said coolant circulates in the coolant jacket. The heat dissipated to the coolant is discharged from the interior of the cylinder head in this way, and is extracted from the coolant again in a heat exchanger.

Merging of the exhaust lines within the cylinder head (i.e., the integration of the at least one exhaust manifold,) together with the equipping of the head with a liquid-type cooling arrangement, leads to rapid warming of the coolant upon a cold start of the engine, and hence to more rapid warming of the internal combustion engine and, if coolant-operated heating of the passenger compartment of a vehicle is provided, to more rapid heating of said passenger compartment.

A liquid-type cooling arrangement has proven to be advantageous in particular in the case of supercharged engines because the thermal loading of supercharged engines is considerably higher than that of air cooled internal combustion engines. The integration of the at least one exhaust manifold into the liquid-cooled cylinder head eliminates the need for an external manifold manufactured from thermally highly loadable material, and this has cost advantages.

Embodiments of the supercharged internal combustion engine are advantageous in which the at least one cylinder head can be connected, at an assembly end side, to a cylinder block, and the at least one coolant jacket integrated in the cylinder head has a lower coolant jacket, which is arranged between the exhaust lines and the assembly end side of the cylinder head, and an upper coolant jacket, which is arranged on that side of the exhaust lines which is situated opposite the lower coolant jacket.

In this context, embodiments of the supercharged internal combustion engine are advantageous in which the upper coolant jacket is connectable to the supply opening and the lower coolant jacket is connectable to the discharge opening.

In this context, embodiments of the supercharged internal combustion engine may also be advantageous in which the upper coolant jacket is connectable to the discharge opening and the lower coolant jacket is connectable to the supply opening.

A pressure gradient can be generated between the upper and lower coolant jackets. The pressure gradient then serves as a driving force for conveying the coolant through the at least one coolant duct of the turbine.

The turbine may be equipped with a variable turbine geometry, which permits a more precise adaptation to the respective operating point of an internal combustion engine by means of an adjustment of the turbine geometry or of the effective turbine cross section. Here, adjustable guide blades for influencing the flow direction are arranged in the inlet region of the turbine. In contrast to the rotor blades of the rotating impeller, the guide vanes do not rotate with the shaft of the turbine.

If the turbine has a fixed, invariable geometry, the guide vanes are arranged in the inlet region so as to be not only stationary but rather also completely immovable, that is to say rigidly fixed. In contrast, in the case of a variable geometry, the guide blades are duly also arranged so as to be stationary but not so as to be completely immovable, rather so as to be rotatable about their axis, such that the flow approaching the rotor blades can be influenced.

The second sub-objective described above is based, namely that of specifying a method for controlling the cooling of the at least one turbine, which can be liquid-cooled, of an internal combustion engine of a type described above is achieved by a method in which, proceeding from a situation in which the bypass line is shut off and at least one coolant jacket is filled with coolant and is separated from the liquid-type cooling arrangement, the return line is opened and the pump is activated in order to convey coolant out of the at least one coolant jacket filled with coolant into the venting tank, the venting reservoir is connected to the at least one coolant jacket of the turbine housing via the vent line and the first port by virtue of the first shut-off element being opened, and the return line and the vent line are shut off and the pump is deactivated when a predetermined quantity of coolant has been conveyed out of the at least one coolant jacket and replaced with air.

That which has been stated in connection with the internal combustion engine according to the invention likewise applies to the method described herein. The at least one air-filled coolant jacket also serves as a heat barrier, which impedes an introduction of heat from the hot exhaust gas into the turbine housing, and cooling of the exhaust gas.

In one example, control of the liquid-type cooling arrangement wherein the extraction of heat in the turbine is reduced after a cold start in order to realize fast heating of the exhaust-gas aftertreatment systems comprises discharging of the coolant.

Embodiments of the method are advantageous in which, proceeding from a situation in which a return line is shut off and at least one coolant jacket is filled with air and separated from the liquid-type cooling arrangement, the bypass line is opened to enable coolant to pass from the venting reservoir into the at least one coolant jacket under the action of gravity, the venting reservoir is connected to the at least one coolant jacket of the turbine housing via the vent line and the first port by virtue of the first shut-off element being opened, in order to enable air to escape from the at least one coolant jacket into the venting reservoir, and the bypass line and the vent line are shut off when a predetermined quantity of coolant has been introduced into the at least one coolant jacket.

In this context, embodiments of the method are advantageous in which the at least one coolant jacket filled with coolant is connected to the liquid-type cooling arrangement of the supercharged internal combustion engine by virtue of the supply opening and the discharge opening being opened. This can be performed already in the warm-up phase if the exhaust-gas aftertreatment systems have reached their operating temperature or desired temperature (e.g., minimum desired temperature).

FIG. 1 shows the turbine 1, which can be selectively liquid-cooled, of a first embodiment of the internal combustion engine 20, together with secondary circuit 3, and partially in a section perpendicular to the turbine shaft 1b. The engine 20 may include a cylinder head 26 coupled to a cylinder block 27 forming at least one cylinder 31. The cylinder head 26 may include a liquid cooling arrangement 28 including an upper coolant jacket 29 and a lower coolant jacket 32. The coolant jackets 29 and 32 may be configured to flow coolant through the engine to remove heat therefrom. The coolant jackets 28 and 29 are configured to flow coolant to a heat exchanger 34 and specifically may be configure to flow coolant to the coolant lines 32 upstream and downstream of the heat exchanger 34, in one example. In one example, the upper coolant jacket 29 may be positioned above exhaust lines merging to form the exhaust manifold 23 and the lower coolant jacket 32 may be positioned below the exhaust lines merging to form the exhaust manifold 23.

Exhaust gas from an internal combustion engine 20 is supplied to the turbine 1 through one or more exhaust lines, denoted via arrow 22. An inlet region 24 of the turbine 1 receiving the exhaust gas is also depicted. The exhaust lines 22 may receive exhaust gas from an exhaust manifold 32 integrated into the engine 20.

The turbine 1, which has a turbine housing 1a, has a flow duct 1d, which conducts the exhaust gas through the turbine 1 and is implemented in the housing 1a, and an impeller 1c, which is arranged in the housing 1a and mounted on the rotatable turbine shaft 1b. The impeller 1c may be referred to as a turbine rotor.

To form a liquid-type cooling arrangement, the turbine 1 is equipped with a coolant jacket 2, which is integrated in the housing 1a and connectable via a supply opening 8a and discharge opening 8b to the engine cooling arrangement 8. The coolant jacket 2 also traverses the housing 1a (i.e., turbine housing). A second shut-off valve element 8a' is provided on the inlet side to open or shut off the supply opening 8a. A third shut-off valve element 8b' is provided on the outlet side to open or shut off the discharge opening 8b. The second shut-off valve element 8a' and third shut-off valve element 8b' are configured to adjust the amount of coolant flowing through the coolant jacket and into an engine cooling system 30. Specifically, they may be open and closed to allow and inhibit coolant flow to and from the engine cooling system 30. The engine cooling system 30 includes coolant lines 32 and a heat exchanger 34 (e.g., radiator). The engine cooling system can also include the coolant jackets 28 and 29 traversing the engine 20. The engine coolant jackets are coupled to the heat exchanger 34 and configured to flow coolant to and receive coolant from the engine coolant jackets. In another example, the coolant jackets (28 and 29) may be coupled to the coolant lines 32 upstream and downstream of the heat exchanger.

The coolant jacket 2 is arranged in a secondary circuit 3, which is separated or can be separated from the engine cooling arrangement 8 and which comprises a venting reservoir 4 that can be filled with air and coolant. The venting reservoir 4 can be connected to a first port 2a of the coolant jacket 2 via an air-conducting vent line 4a, which can be closed and opened by a first shut-off element 4b. A pump 5 for delivering coolant is arranged in a coolant-conducting return line 6, which can be turned on and shut off and which connects the venting reservoir 4 to a second port 2b of the coolant jacket 2. A coolant-conducting bypass line 7, which can be opened and shut off, is used to bypass the pump 5 and connects the venting reservoir 4 to the second port 2b of the coolant jacket 2.

In the present case, the bypass line 7 branches off from the return line 6 downstream of the pump 5 and re-enters the return line 6 upstream of the pump 5, forming a first junction point 10. A 3/2-way valve 9a, which serves as a shut-off device 9, is arranged at the junction point 10. The valve 9a is connected to the second port 2b of the coolant jacket 2, to the return line 6 and to the bypass line 7 and opens either the return line 6 or the bypass line 7 or shuts off the return line 6 and the bypass line 7.

During a first operating condition liquid coolant may be flowed (e.g., circulated) through the coolant jacket 2 and into the engine cooling system 30 where heat is removed from the coolant via the heat exchanger 34. In this way, the turbine can be liquid cooled. On the other hand, during a second operating condition coolant may be flowed out of the coolant jacket 2 into the reservoir 4 leaving the coolant jacket filled with air. During a transition from the first operating condition to the second operating condition, coolant may be flowed into the reservoir 4 from the coolant jacket 2, assisted by gravitational forces, in one example. On the other hand, during a transition from the second operating condition to the first operating condition air may be transferred from the reservoir 4 to the coolant jacket 2 which may be implemented via pumping of coolant from the coolant jacket 2 into the reservoir 4 through operation of the pump S. The first operating condition may be when the engine temperature is above a threshold value, such as when the engine is not in a cold start phase and warmed up. The second operating condition may be when the engine temperature is below the threshold value, such as when the engine is in a cold start phase and not warmed up. Furthermore, it will be appreciated that the turbine 1, coolant jacket 3, venting reservoir 4, pump S, etc., may be included in an engine system 60.

Additionally, a controller 50 (e.g., electronic controller) may be configured to control operation of the pump S, the valve 9a, the shut off element 4b (e.g., valve), the second shut-off valve element 8a' (e.g., valve), and the third shut-off valve element 8b' (e.g., valve). The controller may include code stored in memory 52 executable by a processor 54 to implement the various methods, techniques, etc., described herein. Specifically, the controller 50 may be configured to operate the valve to circulate coolant through the coolant jacket 2 and the engine cooling system 30 during a first operating condition and may be configured to remove coolant from the coolant jacket 2 and replace it with air during transition into a second operating condition. Therefore, during the second operating condition the coolant jacket 2 may be filled with air to aid in the warm up of exhaust system components and during the first operating condition coolant may be circulated through the coolant jacket 2 to enable heat removal from the turbine 1, to reduce the likelihood of turbine overheating as well as enable the turbine to be constructed out of a lower cost less thermally resistant material, such as aluminum, if desired.

Note that the example control and estimation routines included herein can be used with various engine and/or vehicle system configurations. The control methods and routines disclosed herein may be stored as executable instructions in non-transitory memory and may be carried out by a control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. Exemplary valve actuators include electro-mechanical actuators coupled to a valve to adjust the valve in an open or closed configuration, passive valve actuators such as a check valve, etc. The valves also may be pneumatically or hydraulically actuated, in some examples.

FIG. 2 shows a method 200 for controlling the cooling of the at least one turbine configured to be liquid-cooled and included in a supercharged internal combustion engine. The method may be implemented via the turbine 1 and associated systems described above with regard to FIG. 1 or may be implemented via another suitable turbine, systems, etc.

At 202 the method includes opening a return line. The return line may be coupled to a coolant jacket of a turbine and a reservoir. Next at 204 the method includes activating a pump to convey coolant out of the at least one coolant jacket filled with coolant into the venting reservoir. Next at 206 the method includes connecting a venting reservoir to the at least one coolant jacket of the turbine housing via the vent line and the first port by virtue of the first shut-off element being opened.

At 208 the method includes shutting-off the return line and the vent line and at 210 the method includes deactivating the pump when a predetermined quantity of coolant has been conveyed out of the at least one coolant jacket and replaced with air. Steps 202-210 are implemented proceeding from a situation in which at least one coolant jacket is filled with coolant and is separated from the liquid-type cooling arrangement. Further in one example, the amount of coolant pumped out of the coolant jacket is determined (e.g., estimated) to determine when the predetermined quantity of coolant has been conveyed out of the coolant jacket. Additionally in one example, At 212 the method includes opening a bypass line to enable coolant to pass from the venting reservoir into the at least one coolant jacket under the action of gravity. Next at 214 the method includes connecting the venting reservoir to the at least one coolant jacket of the turbine housing via the vent line and the first port by virtue of the first shut-off element being opened, in order to enable air to escape from the at least one coolant jacket into the venting reservoir. At 216 the method includes shutting off the bypass line and the vent line when a predetermined quantity of coolant has been introduced into the at least one coolant jacket. Steps 212-216 are implemented proceeding from a situation in which at least one coolant jacket is filled with air and is separated from the liquid-type cooling arrangement. In one example, the at least one coolant jacket is filled with coolant during certain operating conditions and is connected to the liquid-type cooling arrangement of the internal combustion engine by the supply opening and the discharge opening being opened.

Additionally in one example, a turbine temperature may be estimated based on an amount of air in the coolant jacket, the duration of air in the coolant jacket subsequent to coolant removal from the coolant jacket, engine temperature, and/or ambient temperature. For example, the turbine temperature may be determined based on a duration of time the coolant jacket is filled with air and the amount of air in the coolant jacket. The engine operation may then be adjusted based on the estimated turbine temperature. For instance, when it is estimated that the turbine temperature is below a threshold value a throttle adjustment and/or fuel delivery system adjustment may be implemented to increase the power output of the engine. Additionally, the amount of air or coolant in the coolant jacket may be adjusted based on the estimated turbine temperature, in one example.

FIG. 3 shows a method 300 for operation of an engine system in an internal combustion engine. The method may be implemented via the turbine 1 and associated systems described above with regard to FIG. 1 or may be implemented via another suitable turbine, systems, etc.

At 302 the method includes circulating coolant through a coolant jacket in a turbine housing at least partially enclosing a turbine rotor. Next at 304 the method includes replacing coolant in the coolant jacket with air from a venting reservoir. Replacing coolant in the coolant jacket with air from the venting reservoir may include at 306 adjusting operation of a pump positioned in a return line coupled to the venting reservoir and the coolant jacket based on turbine temperature. Adjusting operation of the pump may include pumping coolant from the coolant jacket to the venting reservoir. It will be appreciated that the venting reservoir may be positioned vertically above the coolant jacket. Therefore in such an example, coolant may be pumped into the venting reservoir to remove the coolant from the coolant jacket and coolant may be flowed via gravity from the venting reservoir to the coolant jacket when the air in the coolant jacket is being replaced with coolant.

Step 302 may be implemented during a first operating condition and step 304 may be implemented during a second operating condition. In one example, the first operating condition may be when the engine and/or turbine are above a threshold temperature and the second operating condition may be when the engine and/or turbine are below the threshold temperature. However additional or alternative operating conditions have been contemplated.

Additionally in one example, the second and third shut-off elements 8a' and 8b' may be closed and the valve 9a and/or valve 4b may be opened for a duration when coolant is removed from the cooling jacket. On the other hand, the valves 9a and/or 4b may be opened for a desired duration when the cooling jacket is filled with coolant after a period of time when it is filled with air. Subsequent to the opening of the valves 9a and 4b these valves can be closed and the second and third shut-off elements 8a' and 8b' may be opened to enable the circulation of coolant through the coolant jacket and the engine cooling system.

FIGS. 1-3 provide for an engine system includes a turbine housing at least partially enclosing a turbine rotor and a coolant jacket traversing the turbine housing receiving coolant flow from an engine cooling system during a first operating condition and replacing coolant in coolant jacket with air from a venting reservoir during a second operating condition.

The invention claimed is:

1. A supercharged internal combustion engine comprising:
   a cylinder head with at least two cylinders;
   coolant passages for the cylinder head;
   at least one turbine in an exhaust-gas turbocharger in which:
   each cylinder of the at least two cylinders has at least one respective outlet opening for discharging exhaust gases out of each of the at least two cylinders and each of the at least one respective outlet opening is adjoined by an exhaust line, the exhaust lines merging to form at least one overall exhaust line, the at least one overall exhaust line opens into the at least one turbine, which has a turbine housing and which has a flow duct which conducts exhaust gas through the turbine housing; and
   the at least one turbine has at least one coolant jacket, which is integrated in the turbine housing;
   wherein the at least one coolant jacket is connectable to the coolant passages;
   the at least one coolant jacket and a venting reservoir which can be filled with air and coolant are arranged in a secondary circuit, which is separate from the coolant passages;
   the venting reservoir is connectable to the at least one coolant jacket via a vent line, the vent line conducts air to the at least one coolant jacket of the turbine housing via a first port and is closable by a first shut-off valve;
   a pump is provided in a return line, the return line conducts coolant and connects the at least one coolant jacket to the venting reservoir via a second port; and
   a bypass line that conducts coolant and connects the venting reservoir to the at least one coolant jacket of the turbine housing via the second port.

2. The supercharged internal combustion engine of claim 1, wherein the bypass line branches off from the return line downstream of the pump and loins the return line upstream of the pump, forming a first junction point, a junction shut-off valve opens either the return line or the bypass line or shuts off the return line and the bypass line.

3. The supercharged internal combustion engine of claim 2, wherein the function shut-off valve, which is a 3/2-way valve, is arranged at the first junction point and which is connected to the second port of the at least one coolant jacket, to the return line and to the bypass line.

4. The supercharged internal combustion engine of claim 1, wherein a second shut-off valve is arranged in the bypass line and a third shut-off valve is arranged in the return line.

5. The supercharged internal combustion engine in claim 1, wherein the first port of the at least one coolant jacket is situated at a geodetically higher point than the second port of the at least one coolant jacket.

6. The supercharged internal combustion engine of claim 1, wherein the venting reservoir is situated at a geodetically higher point than the first port of the at least one coolant jacket.

7. The supercharged internal combustion engine of claim 1, wherein the at least one coolant jacket is at least connectable to the coolant passages of the internal combustion engine via a supply opening and via a discharge opening.

8. The supercharged internal combustion engine of claim 7, wherein, on an inlet side, a second shut-off valve opens or shuts off the supply opening, and a third shut-off valve opens or shuts off the discharge opening on an outlet side.

9. The supercharged internal combustion engine of claim 1, wherein the exhaust lines merge to form the at least one overall exhaust line within the cylinder head.

10. The supercharged internal combustion engine of claim 7, wherein the at least one coolant jacket is integrated in the cylinder head.

11. The supercharged internal combustion engine of claim 10, wherein the cylinder head can be connected to a cylinder block, and the at least one coolant jacket has a lower coolant jacket and an upper coolant jacket.

12. The supercharged internal combustion engine of claim 11, wherein the upper coolant jacket is connectable to the supply opening and the lower coolant jacket is connectable to the discharge opening.

13. The supercharged internal combustion engine of claim 11, wherein the upper coolant jacket is connectable to the discharge opening and the lower coolant jacket is connectable to the supply opening.

14. A method for controlling the cooling of at least one turbine:
the at least one turbine including at least one coolant jackets;
opening a return valve in a return line when the at least one coolant jacket is filled with coolant and is separated from coolant passages of a cylinder head;
activating a pump to convey coolant out of the at least one coolant jacket into a venting reservoir;
opening a first shut-off valve in a vent line to connect the venting reservoir to the at least one coolant jacket via the vent line and a first port; and
closing the return valve in the return line and the first shut-off valve in the vent line; and
deactivating the pump when a predetermined quantity of coolant has been conveyed out of the at least one coolant jacket and replaced with air.

15. The method of claim 14, further comprising
opening a bypass valve in a bypass line to enable coolant to pass from the venting reservoir into the at least one coolant jacked under the action of gravity when the at least one coolant jacket is separated from the coolant passages;
opening the first shut-off valve to connect the venting reservoir to the at least one coolant jacket via a vent line and the first port to enable air to escape from the at least one coolant jacket into the venting reservoir; and
closing the bypass valve in the bypass line and the first shut-off valve in the vent line when a predetermined amount of coolant has been introduced into the at least one coolant jacket.

16. The method of claim 15, where the at least one coolant jacket is filled with coolant during certain operating conditions and is connected to the coolant passages by a supply opening and a discharge opening being opened.

17. A method for operating an engine system in an engine comprising:
during a first operating condition, circulating coolant through a coolant jacket in a turbine housing at least partially enclosing a turbine rotor; and
during a second operating condition, replacing coolant in the coolant jacket with air from a venting reservoir.

18. The method of claim 17, where the first operating condition is when the engine is above a threshold temperature and the second operating condition is when the engine is below the threshold temperature.

19. The method of claim 17, where the venting reservoir is positioned vertically above the coolant jacket.

20. The method of claim 17, further comprising adjusting operation of a pump positioned in a return line coupled to the venting reservoir and the coolant jacket based on turbine temperature.

* * * * *

UNITED STATES PATENT AND TRADEMARK OFFICE
CERTIFICATE OF CORRECTION

PATENT NO. : 10,273,866 B2  
APPLICATION NO. : 14/831670  
DATED : April 30, 2019  
INVENTOR(S) : Helmut Matthias Kindl et al.

It is certified that error appears in the above-identified patent and that said Letters Patent is hereby corrected as shown below:

In the Claims

Claim 2, Line 37, "loins" should read "joins".
Claim 15, Line 2, should read "least one coolant jacket is filled with air and is separated".

Signed and Sealed this  
Thirteenth Day of August, 2019

Andrei Iancu  
*Director of the United States Patent and Trademark Office*